United States Patent
Momiyama et al.

(10) Patent No.: US 6,763,906 B1
(45) Date of Patent: Jul. 20, 2004

(54) REAR WHEEL STEERING DEVICE

(75) Inventors: Fujio Momiyama, Tokyo (JP); Mitsuru Enomoto, Tokyo (JP)

(73) Assignee: Hino Motors, Ltd., Tokyo (JP)

(*) Notice: Subject to any disclaimer, the term of this patent is extended or adjusted under 35 U.S.C. 154(b) by 52 days.

(21) Appl. No.: 10/049,554

(22) PCT Filed: Jun. 22, 2000

(86) PCT No.: PCT/JP00/04111
§ 371 (c)(1),
(2), (4) Date: Feb. 13, 2002

(87) PCT Pub. No.: WO01/98131
PCT Pub. Date: Dec. 27, 2001

(51) Int. Cl.[7] .................................................. B62D 5/06
(52) U.S. Cl. ...................... 180/410; 180/418; 180/24.01; 701/42
(58) Field of Search .................................. 180/410, 415, 180/266, 24.01, 408, 418, 21; 280/405.1; 701/41, 42

(56) References Cited

U.S. PATENT DOCUMENTS

| | | | | |
|---|---|---|---|---|
| 2,359,978 A | * | 10/1944 | Edwards | 280/33.1 |
| 2,698,668 A | * | 1/1955 | McKay | 180/22 |
| 3,831,961 A | * | 8/1974 | Peller | 280/81 A |
| 4,373,738 A | * | 2/1983 | Lange | 280/81.5 |
| 4,789,038 A | * | 12/1988 | Nguyen et al. | 180/24.02 |
| 4,953,650 A | * | 9/1990 | Ohmura | 180/79.1 |
| 5,163,700 A | * | 11/1992 | Loeber | 280/683 |
| 5,607,028 A | * | 3/1997 | Braun et al. | 180/408 |

FOREIGN PATENT DOCUMENTS

| | | |
|---|---|---|
| JP | 05-229443 | 9/1993 |
| JP | 05-330444 | 12/1993 |
| JP | 07-223552 | 9/1995 |
| JP | 07-291139 | 11/1995 |
| JP | 11-348798 | 12/1999 |

* cited by examiner

Primary Examiner—Lesley D. Morris
Assistant Examiner—Tony Winner
(74) Attorney, Agent, or Firm—Reed Smith LLP

(57) ABSTRACT

A rear part of a vehicle body is supported by a rear-front axle (18) and a rear-rear axle (20), and right and left rear-front wheels (17) rotatably mounted at opposite ends of the rear-front axle (18) are constituted so as to be steered by a steering mechanism. The steering mechanism is driven by an actuator so as to steer the rear-front wheels (17), and the actuator (51) is controlled by the control means. The control means stops the steering of the rear-front wheels (17) when a vehicle speed is approximately zero, and the control means operates the actuator when a difference between a theoretical steering angle of the rear-front wheels (17), relative to that of the front wheels (15), and an actual steering angle exceeds a predetermined value even though the vehicle speed is approximately zero.

A substantial part of the carrying load is supported by rear two axles so as to reduce a load exerted to the front wheels, and the rear-front wheels are made steerable in order to prevent tires of the rear-front wheels from being eccentrically worn.

7 Claims, 11 Drawing Sheets

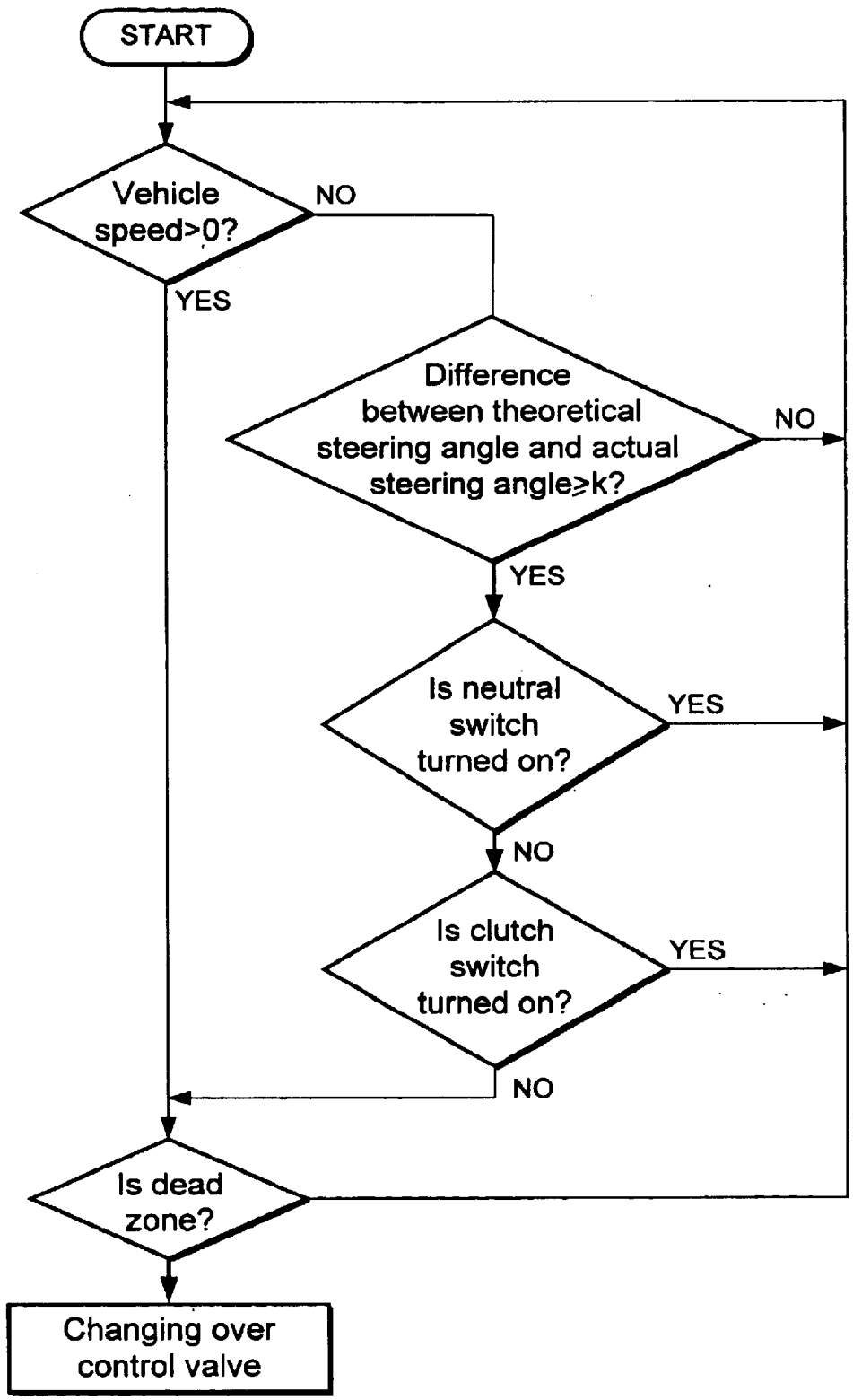
F I G. 9

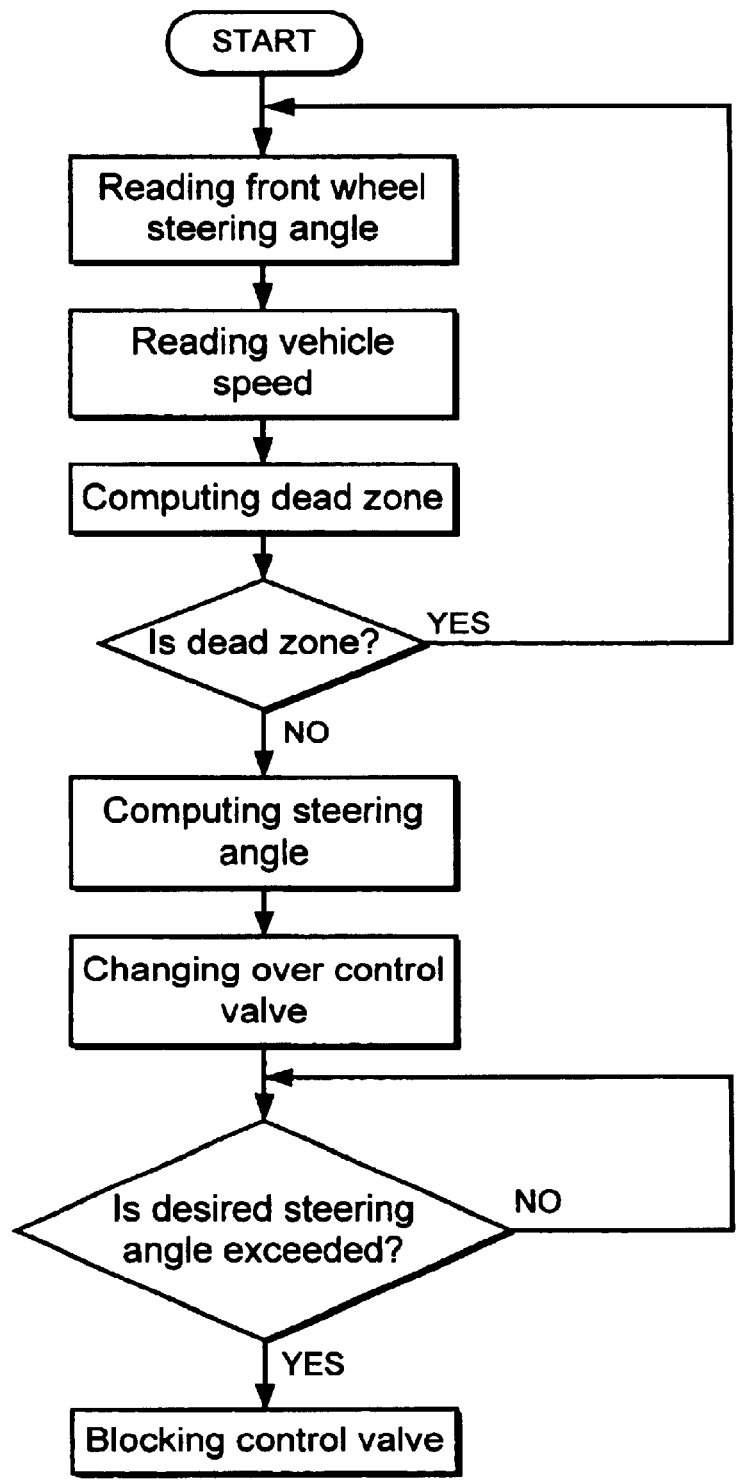
F I G. 10

REAR WHEEL STEERING DEVICE

CROSS-REFERENCES TO RELATED APPLICATIONS

This application claims priority of Japanese PCT Application No. PCT/JP00/04111 filed Jun. 22, 2000, the complete disclosure of which is hereby incorporated by reference.

TECHNICAL FIELD

The present invention relates to a vehicle rear wheel steering device, and in particular to a rear wheel steering device in a two rear axle type vehicle in which the rear part of the vehicle is supported by a rear-front axle and a rear-rear axle.

BACKGROUND ART

Conventionally, there has been widely used a truck with rear two axles as a truck having a high maximum carrying load since only a rear axle consisting of a single axle cannot bear a majority of a carrying load. In particular, with the use of a trunnion type suspension unit suspending rear two axles, no unbalance in load is present between a rear-front axle and a rear-rear axle, and accordingly, both axles can stably bear the carrying load.

In a truck having such a configuration that rear two axles are suspended by a trunnion type suspension unit, all load applied to the rear two axles are born at the middle point between the rear-front axle and the rear-rear axle, that is, at the attaching position of the trunnion bracket. Accordingly, the load is intensively applied to this single point in the longitudinal direction of the vehicle even with the configuration of the rear two axles, and accordingly, a high load has to be born at this position.

In such a truck having rear two axles, it may be considered that both rear two axles are shifted forward in order to reduce, in particular, the load exerted to front wheels having a single tire. That is, the load exerted to the front axle can be reduced by biasing the attaching position of the trunnion bracket forward. However, when both rear two axles are shifted forward, the overhanging part of the vehicle, afterward from the rear-rear axle becomes longer, and accordingly, there is raised such a problem that the rear end of the vehicle swings right and left during turning of the vehicle.

In order to allow the length of the overhanging part to fall in a predetermined range, and as well to reduce the load exerted to the front wheels, the rear front axle is shifted forward and to set the distance between the rear-front axle and the rear-rear axle to be longer. However, should the unsteerable rear-front axle largely biased forward from the rear-rear axle, rear-front wheels (tires) attached to both ends of the rear-front axle would eccentrically be worn during turning of the vehicle. As a result, there has been raised such a problem that the use life of the rear-front wheels (tires) is shortened.

In order to prevent eccentric abrasion of the rear-front wheels (tires), it may be consider to steer the rear-front wheels in response to steering of the front wheels. However, the rear-front wheels bear a high load in comparison with the front wheels, and accordingly, each of the rear-front wheels is usually composed of double wheels having two tires. Thus, a steering unit having a large-sized actuator which can exhibit a large steering force is required for steering the rear-front wheels. As a result, the steering unit becomes large-scale, and accordingly, there has been raised such a problem that the manufacturing cost for the vehicle is increased.

Further, when the rear-front wheels are steered sensitively in response to fine steering of the front wheels, the steering mechanism for the rear-front wheels is operated frequently, causing abrasion of the steering mechanism for the rear-front, as a result, the durability of the steering mechanisms deteriorates, thereby the reliability of the vehicle becomes lower.

Further, when the rear-front wheels are steered sensitively in response to fine steering of the front wheels, the rectilinear running ability of the vehicle is deteriorated during high speed running, and accordingly, the running stability of the vehicle is lowered during high speed running.

A first object of the present invention is to provide a rear-wheel steering device in which a substantial part of a carrying load is born by rear two axles so as to reduce the burden to front wheels, and further, the rear-front wheels can be steered so as to prevent eccentric abrasion of the rear-front wheel tires.

A second object of the present invention is to provide a rear wheel steering device which can steer the rear-front wheels with a relatively small-sized actuator so as to prevent deterioration of the durability of the rear-front wheels, which is caused by unnecessary steering, and further, which can enhance the rectilinear running ability during high speed running, thereby it is possible to improve the running stability.

DISCLOSURE OF INVENTION

The invention relating to claim 1, as shown in FIGS. 1 to 3 and FIG. 8, is an improvement in a rear wheel steering device in a vehicle in which a rear part of a vehicle body is supported by a rear-front axle 18 and a rear-rear axle 20.

The characteristic configuration of this invention comprises a rear-front wheel steering mechanism for steering right and left rear-front wheels 17, 17 which are rotatably mounted at opposite ends of a rear-front axle 18, an actuator 51 for driving the rear-front wheel steering mechanism so as to steer the rear-front wheels 17, and control means 69 for controlling the actuator 51, wherein the control means 69 stops the steering for the rear-front wheels 17 when a vehicle speed is approximately zero, but the control means 69 operates the actuator 51 when a difference between a theoretical steering angle of the rear-front wheels 17, relative to a steering angle of the front wheel 15, and an actual steering angle exceeds a predetermined value even though the vehicle speed is approximately zero.

It is noted that the control means 69 may be constituted so as to cause the actuator 51 to be inoperative when a transmission 25 is set at a neutral position. Further, the control means 69 may be constituted so as to cause the actuator 51 to be inoperative when a clutch is disengaged.

The invention relating to claim 4, as shown in FIGS. 1 to 3 and 8, is an improvement in a rear wheel steering device in a vehicle in which a rear part of a vehicle body is supported by a rear-front axle 18 and a rear-rear axle 20.

The characteristic configuration of this invention comprises a rear-front wheel steering mechanism for steering right and left rear-front wheels 17, 17 which are rotatably mounted at opposite ends of a rear-front axle 18, an actuator 51 for driving the rear-front wheel steering mechanism so as to steer the rear-front wheels 17, and control means 69 for controlling the actuator 51, wherein the control means 69 operates the actuator 51 in accordance with a steering angle of front wheels 15 so as to steer the front-rear wheels 17, and the control means 69 causes the actuator 51 to be inoperative so as to prevent the rear-front wheels 17 from being steered when the steering angle of the front wheels 15 is not more than a predetermined value.

In this arrangement, a ratio of the steering angle of the rear-front wheels 17 with respect to that of the front wheels 15 may be changed in accordance with a vehicle speed, the higher the vehicle speed, the smaller the ratio of the steering angle of the rear-front wheels 17. Further, the critical values in the range of the steering angel of the front wheels 15, in which the rear-front wheels 17 are prevented from being steered, may be changed in accordance with a vehicle speed.

The invention relating to claim 7, as shown in FIGS. 1 to 3 and 8, is an improvement in a rear wheel steering device in a vehicle having three axles, in which a front part of a vehicle body is supported by a front axle 16 while a rear part of the vehicle body is supported by a rear-front axle 18 and a rear-rear axle 20.

In the characteristic configuration of this invention, an inter-axle distance, B, between the rear-front axle 18 and the rear-rear axle 20 is set to be not less than 1,600 mm, and rear-front wheels 17 are mounted at the rear-front axle 18 so as to be steerable, and the rear-front wheels 17 are constituted so as to be steered during turning of the vehicle.

In this arrangement, the rear-front axle 18 may be a dead axle or a driven axle while the rear-rear axle 20 may be a drive axle. Further, both rear-front wheels 17 and rear-rear wheels 19 may be of double wheel type.

In a preferred embodiment of the present invention, the inter-axle distance, B, between the rear-front axle 18 and the rear-rear axle 20 for supporting the rear part of the vehicle body is set to be not less than 1,600 mm, and preferably set to be not less than 1,800 mm, and the rear-front axle 18 and the rear-rear axle 20 are arranged so that the inter-axle distance, B, between the rear-front axle 18 and the rear-rear axle 20 becomes not less than 20%, preferably not less than 25% with respect to an inter-axle distance, A, between the front axle 16 and the rear-rear axle 20. It is noted that should this rate is less than 20%, a load exerted to the front axle 16 could not be sufficiently reduced. Further, the rear-rear axle 20 is used as a drive axle having rear-rear wheels 19 which are attached to opposite ends of the drive axle so as to be unsteerable while the rear-front axle 20 is a driven axle having the rear-front wheels 17 which are attached to the opposite ends of the driven axle so as to be steerable, and further, the rear-front wheels 17 are constituted so as to be steered in accordance with a steering angle of front wheels 15 by means of an electronic control unit 69 and an actuator 51.

Steering for such rear-front wheels 17 under electronic control is not carried out when the vehicle speed is approximately zero, and accordingly, the rear-front wheels 17 can be steered by the actuator 51 even though the actuator 51 is relatively small-sized and has a low output power. However, even though the vehicle speed is approximately zero, the actuator 51 is operated when a difference between an ideal steering angle of the rear-front wheels 17, relative to that of the front wheels 15, and an actual steering angle is not less than a predetermined angle, and accordingly, the rear-front wheels 17 can be smoothly steered during a start of the vehicle.

Steering of the rear-front wheels 17 during running is carried out in association with a steering angle of the front wheels 15, and the ratio of the steering angle of the rear-front wheels 17 with respect to that of the front wheels 15 can be changed in accordance with a vehicle speed, that is, the higher the vehicle speed, the less the ratio of the steering angle of the rear-front wheels 17 relative to that of t he front wheels 15. When the steering angle of the front wheels 15 is not more than a predetermined value, the steering of the rear-front wheels 17 is stopped, that is, a dead zone is provided so that unnecessary steering of the rear-front wheels 17 is prevented. Further, the critical values of the steering angle of the front wheels 15 in the de ad zone where the steering of the rear-front wheels 17 is stopped, are changed in accordance with a vehicle speed so as to enhance the rectilinear running ability during high speed running, in order to enhance the running stability.

BRIEF DESCRIPTION OF DRAWINGS

FIG. 9 is a flow-chart for explaining change-over operation of a control valve;

FIG. 10 is a flow-chart for explaining control of the steering angle of the rear-front wheels;

Best Mode for Carrying Out the Invention

Next, detailed explanation will be made of embodiments of the present invention with reference to the accompanying drawings.

Figure 1:
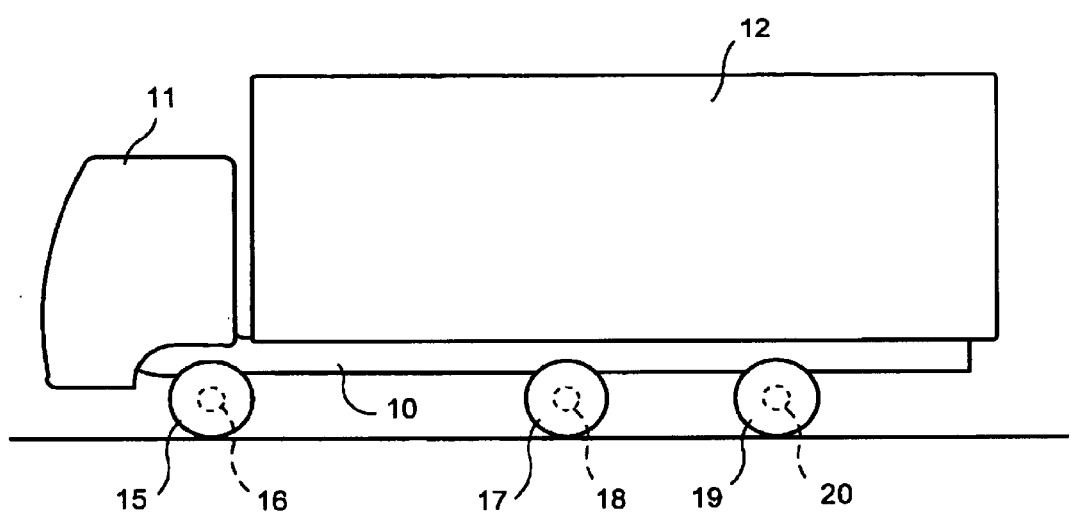
FIG. 1 is a side view illustrating a truck incorporating a rear wheel steering device according to the present invention.

Referring to FIG. 1 which is a truck having rear two axles, according to the present invention, a cab 11 is installed in the front part of a vehicle body frame 10. Further, a cargo box 12 is mounted on the vehicle body frame 10 in rear of the cab 11.

The front part of the vehicle body frame 10 of the truck is supported by a front axle 16 which is rotatably mounted at its opposite ends with front wheels 15. Meanwhile, the rear part of the vehicle body frame 10 is supported by a rear-front axle 18 which is rotatably mounted at right and left sides with rear-front wheels 17, and a rear-rear axle 20 which is rotatably mounted at right and left sides with rear-rear wheels 19. Further, the front wheels 15 are a single wheel type, and the rear-front wheels 17 and the rear-rear wheels 19 are of a double wheel type.

Figure 2:
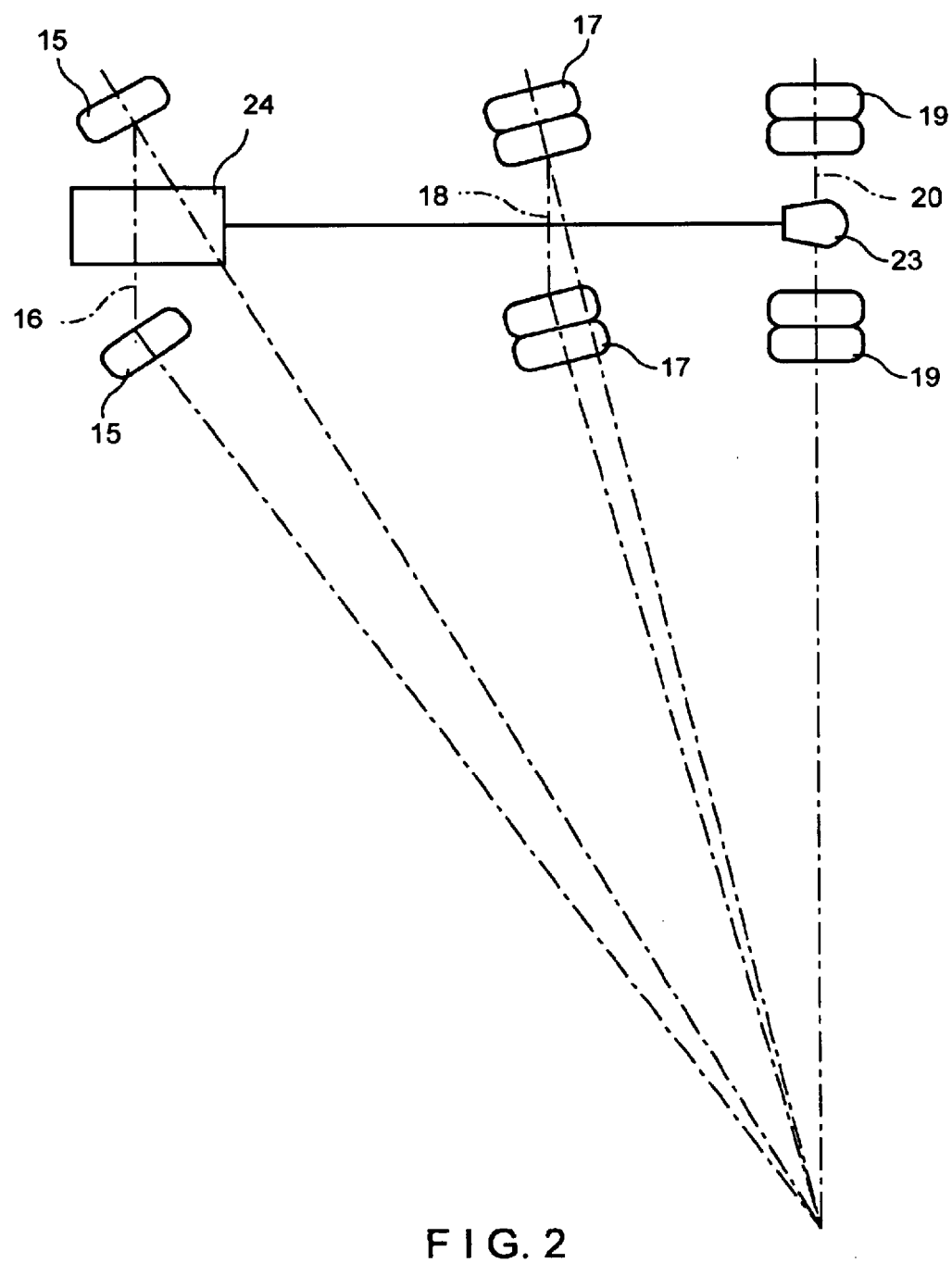
FIG. 2 is a plan view illustrating a configuration of wheels when the truck turns.

In this configuration, the front wheels 15, and the rear-front wheels 17 and the rear-rear wheels 19 are arranged as shown in FIG. 2. In particular, when the front wheels 15 is steered during turning of the vehicle, the rear-front wheels 17 is constituted so as to be steered in association therewith, and a point of intersection of an extension line of the center axis of the rear-front wheels 17 during turning and an extension line of the rear-rear axle 20 is constituted so as to be coincident with the turning center of the vehicle. With this arrangement, the rear-front axle 18 can be largely biased forward with respect to the rear-rear axle 20 in comparison with a conventional truck while eccentric abrasion of tires of the rear-front wheels 17 can be surely prevented.

A distance, A, between the front axle 16 and the rear-rear axle 20 is set to 7,000 mm while a distance, B, between the rear-front axle 18 and rear-rear axle 20 is set to 1,800 mm. Incidentally, in a conventional trunnion suspension device, when the distance, A, is set to 7,000 mm, the distance, B, is set to about 1,300 mm. That is, the inter-axle distance, B, in the configuration of this embodiment, is set to a value which is about 1.5 times as long as the conventional inter-axle distance, B.

Figure 3:
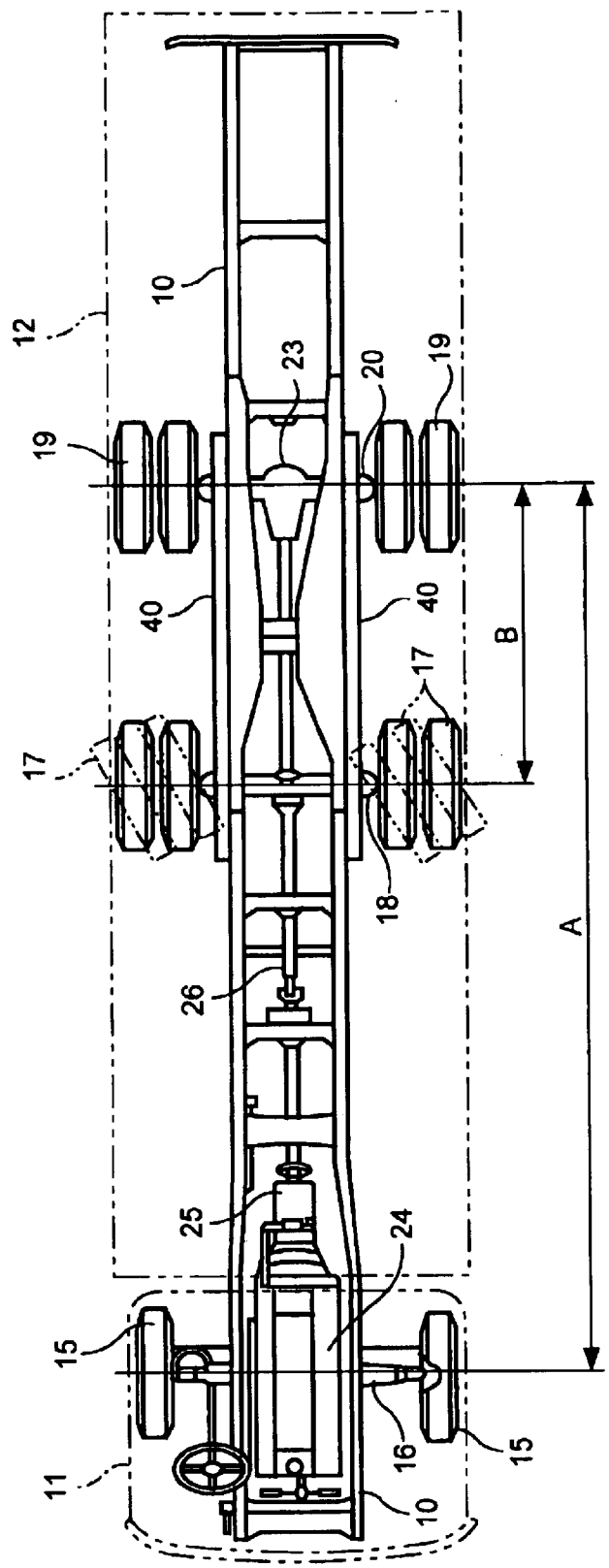
FIG. 3 is a plan view illustrating the entire configuration of the truck.

When the front axle 16, the rear-front axle 18 and the rear-rear axle 20 are arranged as shown in FIG. 3, the load allocation among the three axles 16, 18, 20 is set to about 1:2:2 in such a case that an approximately uniformly distributed load is applied to a part of the cargo box 12. That is, the load exerted to the front axle 16 can be set to a value which is a half of the load exerted to each of the rear-front axle 18 and the rear-rear axle 20.

Accordingly, in the case of a truck having a carrying load of 25 tons, a load of five tons is exerted to the front axle 16 while a load of ten tons is exerted to the rear-front axle 18 and a load of ten tons is exerted to the rear-rear axle 20. The relationship of the load allocation, is proportional to the number of tires of the wheels 15, 17, 19. That is, a load of 2.5 tons is applied to each of the tires, and accordingly, the loads exerted to all tires of the front wheels 15, the rear-front wheels 17 and the rear-rear wheels 19 become equal to one another.

It is noted that the rear-rear axle 20 is a drive axle while the rear-front axle 18 is a dead axle or a driven axle. As shown in FIG. 3, a differential gear unit 23 is mounted at the rear-rear axle 20. The differential gear unit 23 is coupled to an engine 24 underneath the cab 11 through the intermediary of a transmission 25 and a propeller shaft 26, and accordingly, a drive power from the engine 24 is transmitted to the rear-rear wheels 19.

Figure 4:
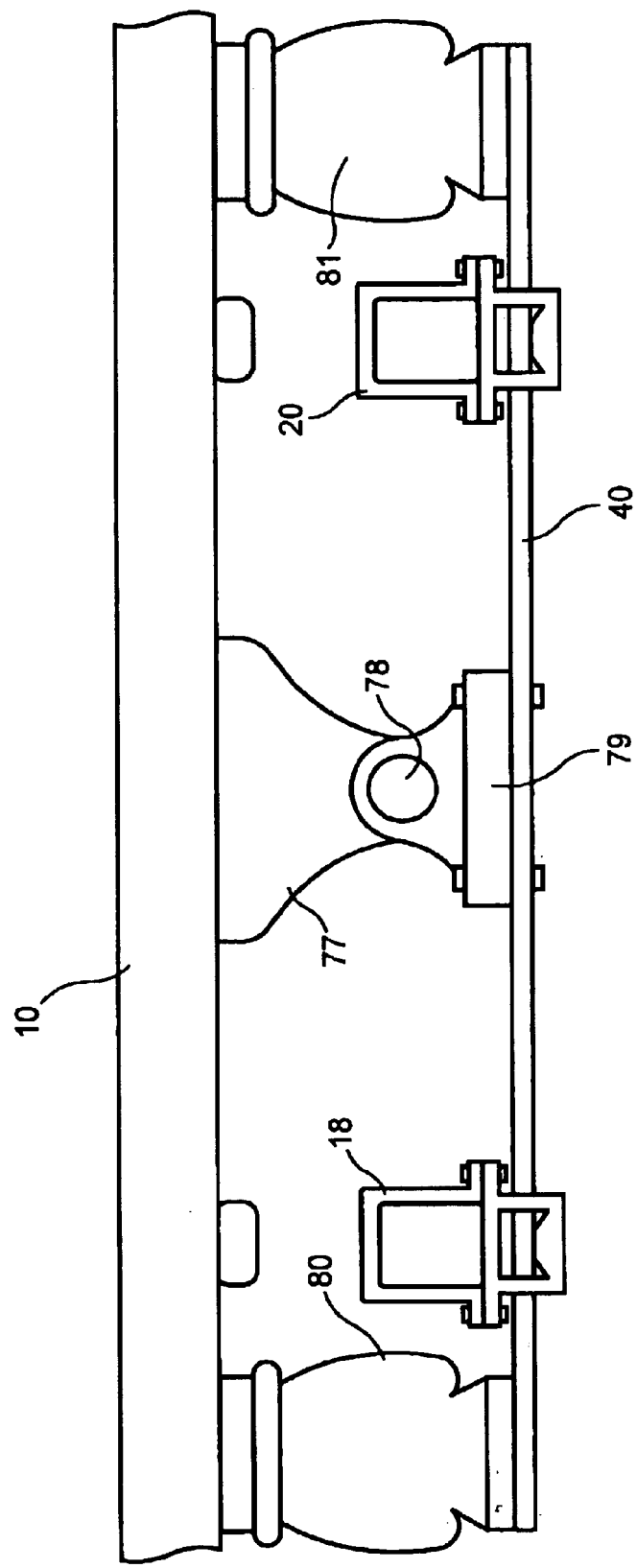
FIG. 4 is a side view illustrating a suspension mechanism for a rear-front axle and a rear-rear axle.

Next, explanation will be made of a suspension structure for the rear-front axle 18 and the rear-rear axle 20. As clearly shown in FIG. 4, a trunnion bracket 77 is attached to the vehicle body frame 10 at an approximately middle position between the rear-front axle 18 and the rear-rear axle 20, and a trunion shaft 78 is rotatably supported by the trunnion bracket 77. Further, trunnion seats 79 are mounted respectively on both sides of the trunnion shaft 78, and leaf springs 40 or beams which are longitudinally extended, are mounted at the trunnion seats 79 by means of U-bolts.

Front slide air springs 80 are interposed between the front ends of the leaf springs 40 or the beams and the frame 10, and rear side air springs 81 are interposed between the rear ends of the leaf springs 40 or the beams and the vehicle body frame 10. Further, the rear-front axle 18 is suspended in the vicinity of the front end of the leaf spring 40, and the rear-rear axle 20 is suspended in the vicinity of the rear end of the leaf spring 40.

Figure 5:
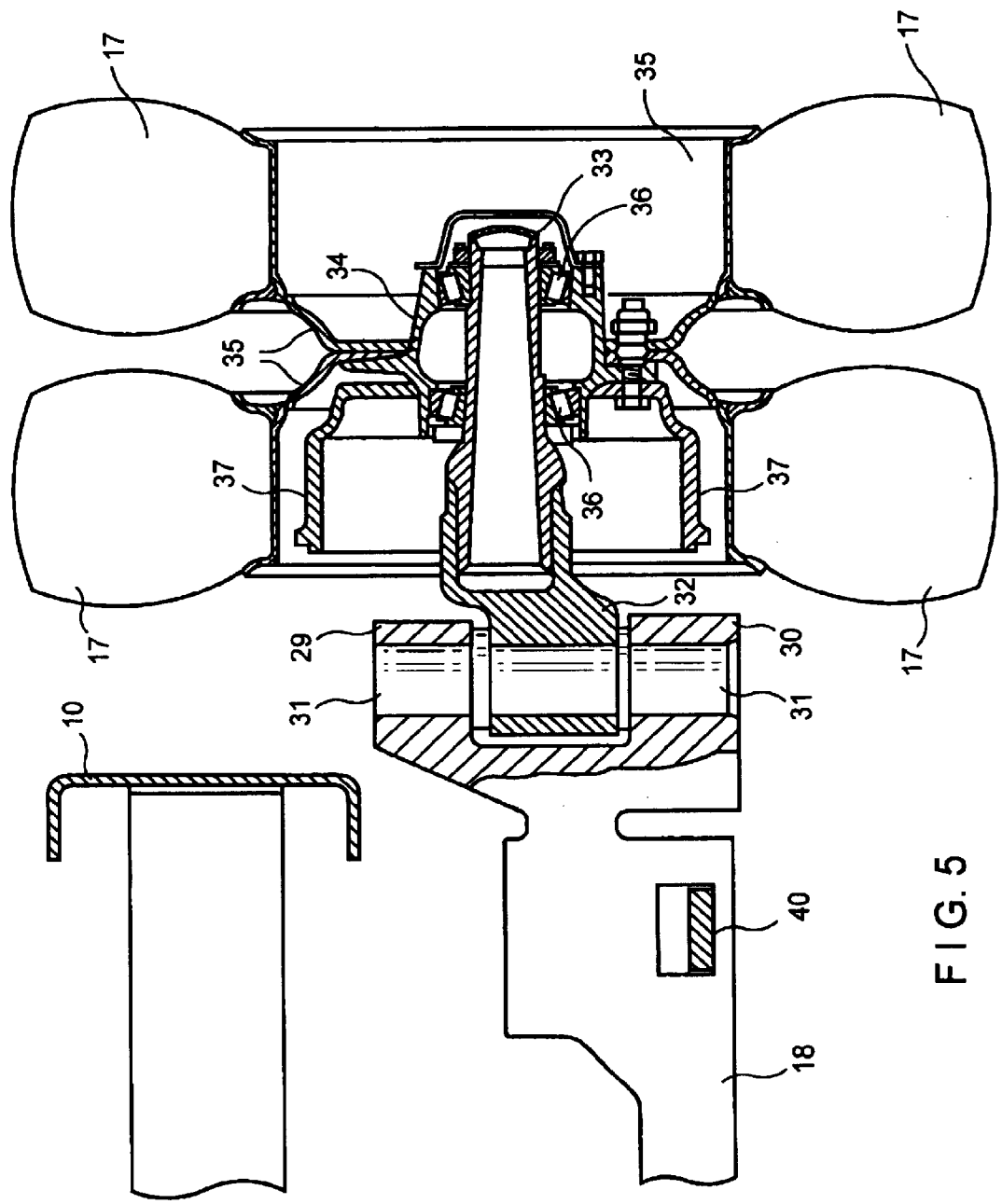
FIG. 5 is a vertical cross-sectional view illustrating a main structure for attaching rear-front wheels to the rear-front axle.
Figure 6:
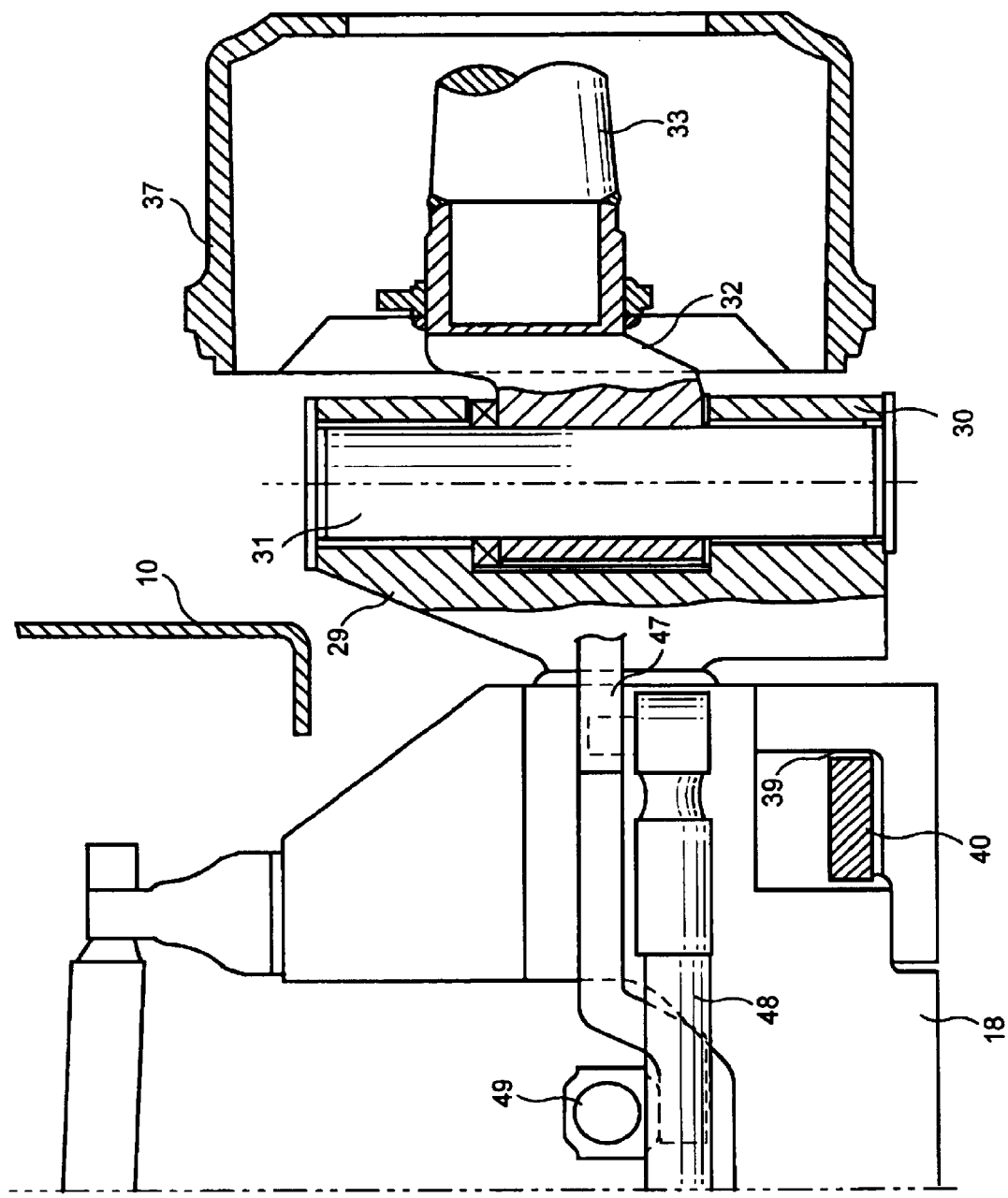
FIG. 6 is an enlarged vertical cross-sectional view of a main part shown in FIG. 5.

Next, explanation will be made of a steering mechanism for the rear-front wheels 17, which is mounted at the rear-front axle 18. As shown in FIGS. 5 and 6, the rear-front axle 18 is formed of an Elliot type axle, and attaching arms 29 and 30 are provided vertically at the right and left ends thereof. The upper and lower ends of a king pin 31 are held by these attaching arms 29 and 30, and a knuckle 32 is steerably attached at its center to the longitudinally middle position of the king pin 31.

A hollow spindle 33 is fixed to one end of the knuckle 32, and a hub 34 is rotatably mounted on the spindle 33 through the intermediary of bearings 36. A wheel 35 is mounted at the hub 34. The rear-front wheels 17 are constituted by tires mounted at the outer periphery of the wheels 35.

As shown in FIGS. 5 and 6, the rear-front axle 18 is formed therein with receiving parts 39 which are opened in the vicinity of the right and left ends thereof, respectively, the leaf springs 40 constituting suspension springs are inserted in the receiving parts 39. Further, the rear-front axle 18 is coupled to the vehicle body frame 10 by means of a torque rod which is not shown.

Figure 7:
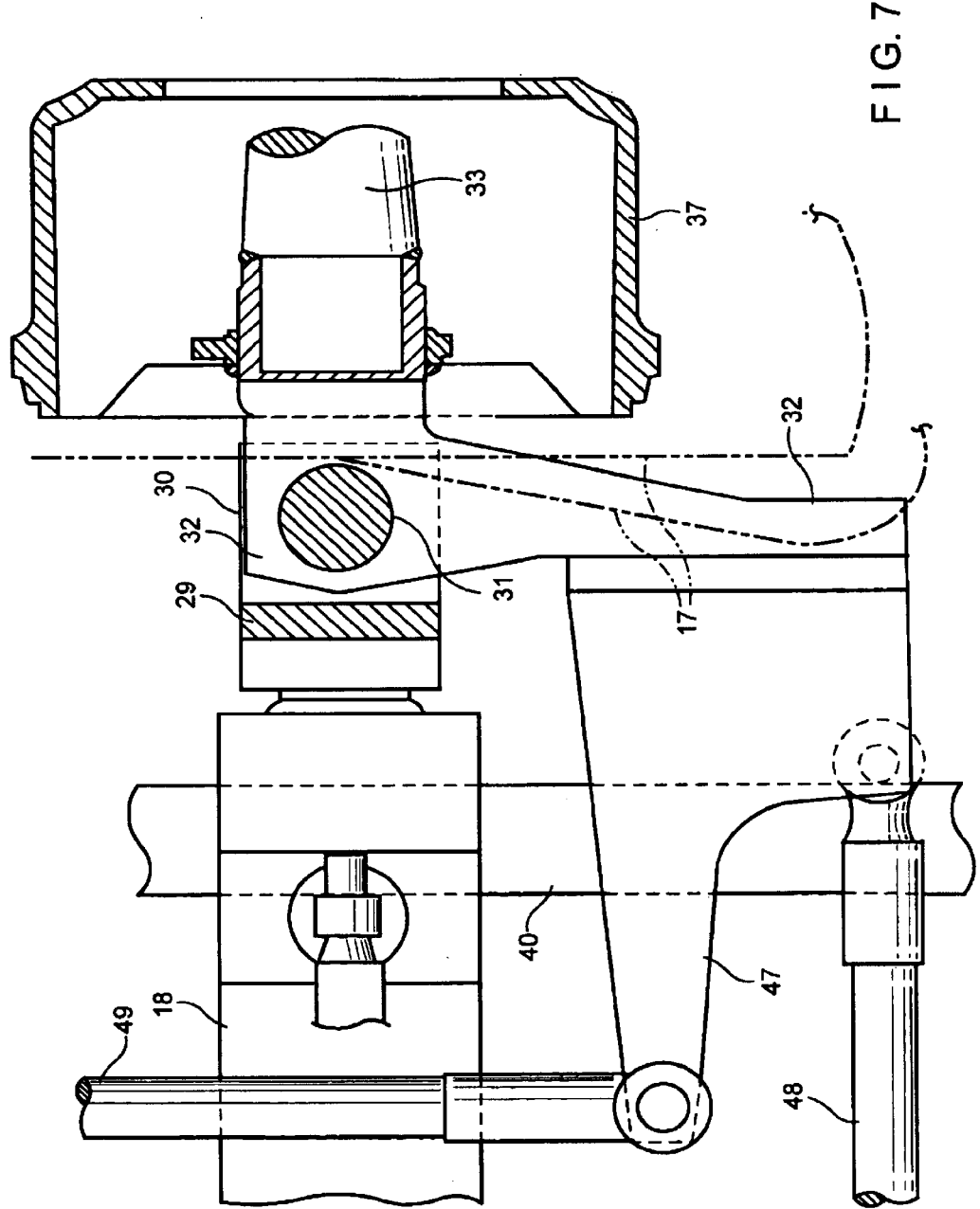
FIG. 7 is an enlarged plan view illustrating a main structure for attaching the rear-front wheel to the rear-front axle.

The right and left knuckles 32 for supporting the rear-front wheels 17 are secured thereto with one end of right and left knuckle arms 47, respectively, as clearly shown in FIG. 7, and the knuckle arms 47 are coupled to each other by means of a tie rod 48. With this arrangement, an Ackermann type steering mechanism is obtained.

Figure 8:
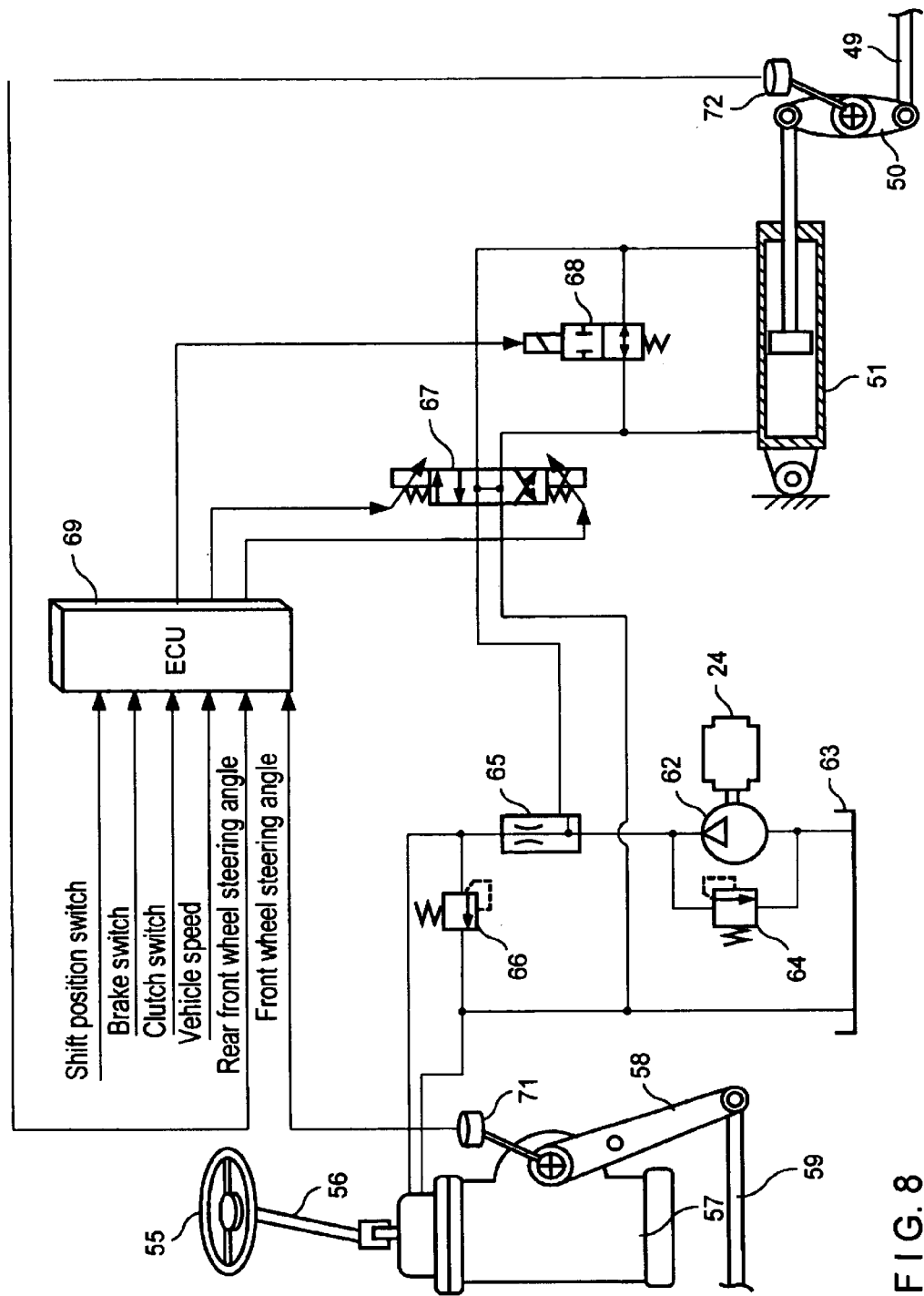
FIG. 8 is a diagram illustrating a hydraulic circuit for operating a hydraulic cylinder for steering the rear-front axle.

A drug link 49 is coupled to the other end of the knuckle arm 47, as shown in FIGS. 7 and 6, and the drug link 49 is coupled to a piston rod of the hydraulic cylinder 51 through the intermediary of an invert lever 50, as shown in FIG. 8. When the hydraulic cylinder 51 is operated so that the drug link 49 is pulled and pushed back, the knuckle 32 is constituted to be rotated about the king pin 31 as a center through the intermediary of the knuckle arm 47 to thereby steer the rear-front wheel 17 mounted at the knuckle 32.

Further explanation will be made of a hydraulic circuit for operating the hydraulic cylinder 51 with reference to FIG. 8. A steering wheel 55 for steering the front wheels 15 is attached to the upper end of a steering shaft 56 whose lower end is coupled thereto with a steering shaft of a power steering device 57. A pitman arm 58 is attached to a side part of the power steering device 57, and a drug link 59 for steering the front wheels 15 is coupled to the pitman arm 58.

An oil pump 62 for driving the power steering device 57 is provided, being directly coupled to the engine 24. The oil pump 62 is constituted to suck up oil from a reservoir 63 so as to pressurize the oil. Further a relief valve 64 is connected to the oil pump 62, and a regulator valve 65 constituting a priority valve is connected to the oil pump 62 on the discharge side thereof. The discharge side of the oil pump 62 is connected to the power steering device 57 through the intermediary of the regulator valve 65. A relief valve 66 is connected in parallel to a pipe line connecting between the regulator valve 65 and the power steering device 57.

A port at one side of the priority valve 65 is connected to a control valve 67 which is connected to a pair of ports in the hydraulic cylinder 51 through the intermediary of a pair of pipe lines. A cut-off valve 68 for blocking and communicating the pair of ports of the hydraulic cylinders 51 interconnects the pair of pipe lines connected to the pair of ports of the hydraulic cylinder 51. Further, the priority valve 65 and the cut-off valve 68 are controlled by an electronic control unit (ECU) 69.

Detection outputs from a shift switch for the transmission 25, a brake switch, a clutch switch and a vehicle speed sensor are connected to the control input of the electronic control unit 69. Further, detection outputs from a steering angle sensor 71 for the front wheel 15, attached to a fulcrum of the pitman arm 58 of the power steering device 57, and a steering angle sensor 72 for the rear-front wheels 17, attached to a fulcrum of the invert lever 50, are connected to the control input of the electronic control unit 69.

The operation of the thus constituted rear wheel steering device will be explained.

Referring to FIG. 8, when the steering wheel 55 is turned, the power steering device 57 is operated through the intermediary of the steering shaft 56 so as to rotate the pitman arm 58, and accordingly, the front wheel 15 is steered through the intermediary of the drug link 59. At this time, a steering angle of the front wheel 15 is detected by the steering angle sensor 71, and the output of the sensor 71 is input to the electronic control unit 69.

The priority valve 65 for supplying pressurized oil to the power steering device 57 feeds oil in excess to the control valve 67 side. When the control valve 67 has not yet changed over, the oil fed into the control valve 67 is returned to the reservoir 63 from the control valve 67 via the priority valve 65. When the control valve 67 is changed over by the electronic control unit 69, the oil fed into the control valve 67 via the priority valve 65 is then fed into the hydraulic cylinder 51 via the control valve 67. At this time, the operating direction of the hydraulic cylinder 51 is either a direction in which the piston rod is retracted or a direction in which the piston rod is extended, in response to a change-over direction of the control valve 67.

Due to the operation of the hydraulic cylinder 51, the motion of the piston rod of the hydraulic cylinder 51 is transmitted to the drug link 49 through the intermediary of the invert lever 50, and accordingly, the drug link 49 rotates the knuckle 32 through the intermediary of the knuckle arm 47. As a result, the rear-front wheel 17 to which the knuckle 32 is attached is steered.

When the steering angle of the rear-front wheel 17 which is detected by the steering angle sensor 72 attached to the fulcrum of the invert lever 50, reaches a steering angle corresponding to a steering angle of the front wheel 15, the electronic control unit 69 changes over the control valve 67 into a blocking condition so as to stop the operation of the hydraulic cylinder 51. Thus, the rear-front wheel 17 is steered by an angle in association with a steering angle of the front wheel 15. This condition is shown in FIG. 2.

As clearly shown in FIG. 9, the above-mentioned control operation is ceased when the vehicle speed is zero. However, even thought the vehicle speed is zero, when the difference between a theoretical steering angle of the rear-front wheel 17, relative to that of the front wheel 15, and an actual steering angle is not less than a predetermined value, and when both neutral switch in the transmission 25 and clutch switch have not yet turned on while the steering angle of the front wheel 15 does not fall in a dead zone not more than a predetermined value shown in FIG. 11, the electronic control unit 69 changes over the control valve 67 so as to operate the hydraulic cylinder 51.

This is because pressure is abruptly applied to the hydraulic cylinder 15 just upon a start of running of the vehicle if the hydraulic cylinder 15 is set to be completely inoperative when the vehicle speed is zero, and accordingly, the rear-front wheel 17 should be prevented from being impulsively steered. As understood from the flow-chart shown in FIG. 9, when the electronic control unit 69 changes over the control valve 67, the rear-front wheel 17 can be smoothly steered when the vehicle starts running.

Next, explanation will be made of the stop operation of the steering of the rear-front wheel 17 in the dead zone with reference to FIGS. 10 and 11.

Figure 11:
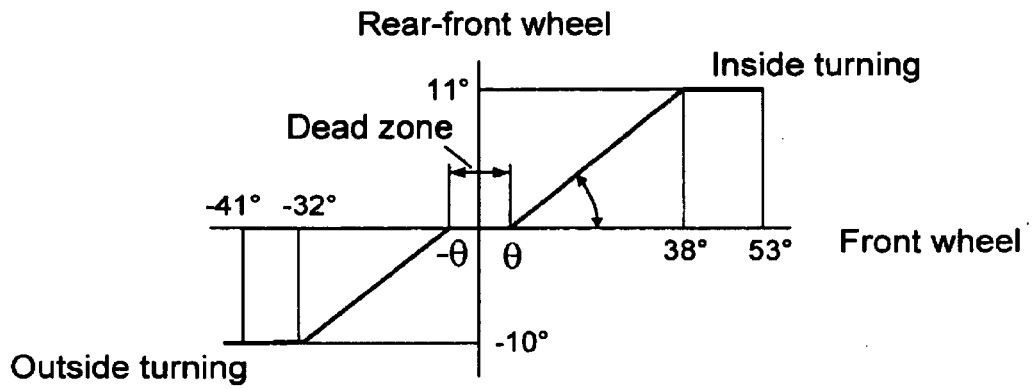
FIG. 11 is a view illustrating a change in the steering angle of the rear-front wheels, relative to a change in that of front wheels.

The electronic control unit 69 reads a steering angle of the front wheel 15 in the form of a detection output of the steering angle sensor 71, and a vehicle speed in the form of a detection output of the vehicle speed sensor, and computes the dead zone shown in FIG. 11, from these values. That is, since the dead zone varies, depending upon a vehicle speed as shown in FIG. 12, the electronic control unit 69 computes whether the steering angle of the front wheel 15 at the vehicle speed is not less than an angle of the dead zone in order to determine whether the steering of the rear-front wheel 17 is ceased or not.

Figure 13:
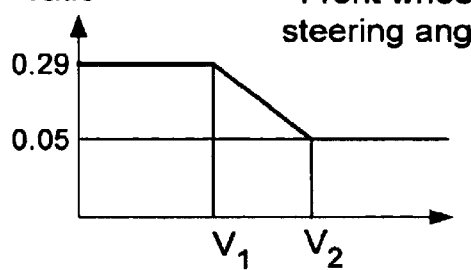
FIG. 13 is a view a change in the ratio of the steering angle of the rear-front wheels, relative to that of the front wheels in accordance with a vehicle speed.

When the steering angle of the front wheel 15 exceeds the angle of the dead zone, the electronic control unit 69 computes a steering angle of the rear-front wheel 17. This steering angle varies depending upon a vehicle speed since the ratio of the steering angle of the rear-front wheel 17 with respect to the steering angle of the front wheel 15 is changed depending upon the vehicle speed as shown in FIG. 13. Accordingly, the electronic control unit 69 reads a vehicle speed, and computes a steering angle of the rear-front wheel 17 from the steering angle of the front wheel 15 at that speed. Thereafter, the electronic control unit 69 changes over the control valve 67, and determines whether an actual steering angle is not less than a desired steering angle obtained by the above-mentioned computation or not, and when it is not less than the desired steering angle, the control valve 67 is blocked so as to cease the control operation.

Figure 12:
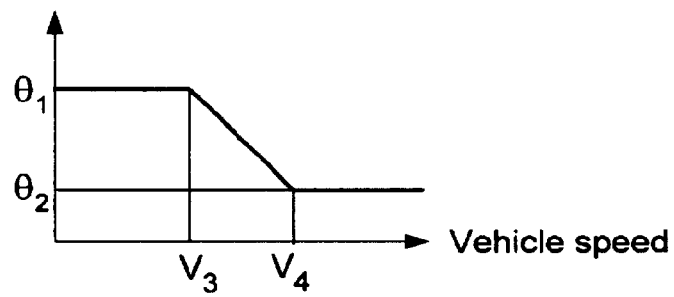
FIG. 12 is a view illustrating a change in the steering angle of the front wheels in a dead zone in accordance with a vehicle speed.

As shown in FIGS. 11 and 12, by setting a dead zone in which the rear-front wheel 17 is not steered even though the front wheel 15 is steered, in the case of finely steering the front wheel 15 by manipulating the steering wheel 55 with a small degree, the steering of the rear-front wheel 17 does not respond to such a fine steering of the front wheel 15. That is, the steering mechanism of the rear-front wheel 17 is not sensitively associated with the steering operation of the front wheel 15, and accordingly, unnecessary steering of the rear-front wheel 17 is prevented. With this arrangement, the durability of the steering mechanism for the rear-front wheel 17 is prevented from being lowered, and accordingly, the component parts thereof are protected. Thus, it is possible to greatly improve the running stability, in particular the running stability during high speed running since unnecessary steering of the rear-front wheel 17 is prevented.

It is noted that the steering angle of the front wheel 15 becomes relatively small as the vehicle speed increases. Accordingly, should the dead zone be set to be constant, the responsive sensitivity of the steering mechanism for the rear-front wheel 17 is gradually deteriorated as the vehicle speed increases. Accordingly, the dead zone is changed in accordance with a vehicle speed as shown in FIG. 12 so that the angle of the dead zone is gradually decreased as the vehicle speed increases, thereby it is possible to prevent the responsive sensitivity of the steering mechanism for the rear-front wheel 17 from being deteriorated.

Further, as shown in FIG. 13, the ratio of the steering angle of the rear-front wheel 17, relative to that of the front wheel 15 is changed, depending upon a vehicle speed. In particular, by carrying out such control that the relative steering angle of the rear-front wheel 17 is decreased as the vehicle speed increases, unnecessary steering of the rear-front wheel 17 is restrained during high speed running, and accordingly, the rectilinear running ability of the vehicle during high speed running is enhanced, thereby it is possible to improve the running stability.

As stated above, according to the present invention, the rear part of the vehicle body is supported by the rear-front axle and the rear-rear axle, and the control means steers the rear-front wheels by means of the actuator and the rear-wheel steering mechanism while the control means stops the steering operation of the rear-front wheels when the vehicle speed is approximately zero, thereby it is possible to steer the rear-front wheel even with a small-sized actuator. Further, the control means operates the actuator when the difference between a theoretical steering angle of the rear-front wheels, relative to that of the front wheels, and an actual steering angle exceeds a predetermined value even though the vehicle speed is approximately zero, and accordingly, it is possible to smoothly steer the rear-front wheels when the vehicle starts running.

Further, when the transmission is set at a neutral position, or the clutch is disengaged, if the control means causes the actuator to be inoperative, the actuator is prevented from being operated even though the difference between a theoretical steering angle of the rear-front wheels, relative to that of the front wheels, and an actual steering angle exceeds a predetermined value.

Further, if the control means controls the actuator so as to steer the rear-front wheels in accordance with a steering angle of the front wheels while the control means controls the actuator so as to prevent the rear-front wheels from being steered when the steering angle of the front wheel is not more than a predetermined value, it is possible to prevent the steering mechanism for the rear-front wheels from sensitively responding to the steering operation of the front wheels, thereby it is possible to avoid deteriorating the durability of the steering mechanism for the rear-front wheels.

Further, if the ratio of the steering angle of the rear-front wheels with respect to that of the front wheels is changed in accordance with a vehicle speed, that is, the higher the vehicle speed, the less the ratio of the steering angle of the rear-front wheels, the steering angle of the rear-front wheels becomes relatively less as the vehicle speed increases, thereby it is possible to enhance the running stability during high speed running. Further, if the critical values in the range of the steering angle of the front wheel, in which the steering operation of the rear-front wheels is not carried out, are changed, depending upon a vehicle speed, a dead zone in accordance with a vehicle speed can be set, thereby it is possible to avoid deteriorating the responsive sensitivity of the steering of the front wheels during high speed running.

Further, if the front end side of the vehicle body is supported by the front axle while the rear side of the vehicle body is supported by the rear-front axle and the rear-rear axle, the inter-axle distance between the rear-front axle and the rear-rear axle is set to be not less than 1,600 mm, and further, the rear-front wheels are mounted at the rear-front axle so as to be steerable in order that the rear-front wheels are steered during turning of the vehicle, the load allocation among the wheels of the three axle vehicle can be approximately uniform.

Further, if the rear-front axle is used as a dead axle or a driven axle while the rear-rear axle is used as a drive axle, the structure composed of the steering mechanism for the front-rear wheels mounted at the rear-front axle and the drive mechanism for the rear-rear wheels can be simplified. Further, if both rear-front wheels and rear-rear wheels are of a double wheel type, the tires of the rear-front wheels and the rear-rear wheels can be prevented from being eccentrically worn since the rear-front wheels of the double wheel type are steered.

Industrially applicability a rear wheel steering device according to the present invention is used for a two rear-axle type vehicle, a three axle type vehicle in which a front end side of a vehicle body is supported by a front axle while a rear side of the vehicle body is supported by a rear-front axle and a rear-rear axle, and accordingly, it is possible to enhance the running ability and the turning ability of these vehicles.

What is claimed is:

1. A rear wheel steering device in a vehicle in which a rear part of a vehicle body is supported by a rear-front axle (18) and a rear-rear axle (20), comprising:

a rear-front wheel steering mechanism for steering right and left rear-front wheels (17,17) rotatably mounted at opposite ends of the rear-front axle (18), an actuator (51) for driving the rear-front wheel steering mechanism so as to steer the rear-front wheels, and control means (69) for controlling the actuator (51), characterized in that the control means (69) stops the steering of the rear-front wheels when a vehicle speed is approximately zero, and the control means (69) operates the actuator (51) so that a steering angle of the rear-front wheels (17) is coincident with a theoretical steering angle by associating the steering angle of the rear-front wheels (17) with that of the front wheels (15) when a difference between the theoretical steering angle of the rear-front wheels (17), relative to that of the front wheels (15), and an actual steering angle exceeds a predetermined value even though the vehicle speed is approximately zero.

2. The rear wheel steering device of claim 1, wherein the control means (69) causes the actuator (51) to be inoperative when a transmission (25) is set to a neutral position.

3. The rear wheel steering device of claim 1, wherein the control means (69 causes the actuator (51) to be inoperative when a clutch is disengaged.

4. The rear wheel steering device in of claim 1, wherein the rear-front axle (18) and the rear-rear axle (20) are disposed so that an inter-axle distance (B) between the rear-front axle (18) and the rear-rear axle (20) is set to be not less 20% with respect to an inter-axle distance (A) between a front axle (16) and the rear-rear axle (20).

5. The rear wheel steering device of claim 4, wherein the rear-front axle (18) is a dead axle or a driven axle, and the rear-rear axle (20) is a drive axle.

6. The rear wheel steering device of claim 4, wherein both rear front wheels (17) and rear-rear wheels (19) are double wheels.

7. A rear wheel steering device in a vehicle in which a rear part of a vehicle body is supported by a rear-front axle (18) and a rear-rear axle (20), comprising:

a rear-front wheel steering mechanism for steering right and left rear-front wheels (17,17) rotatably mounted at opposite ends of the rear-front axle (18), an actuator (51) for driving the rear-front wheel steering mechanism so as to steer the rear-front wheels (17), and control means (69) for controlling the actuator (51), characterized in that the control means (69) operates the actuator (51) in accordance with a steering angle of front wheels (15) so as to steer the front-rear wheels (17), the control means (69) causes the actuator (51) to be inoperative so as to prevent the rear-front wheels (17) from being operated when the steering angle of the front wheels (15) is less than a predetermined value, and the control means (69) operates the actuator (51) so as to change a ratio of the steering angle of the rear-front wheels (17) with respect to that of the front wheels (15) in accordance with a vehicle speed, the higher the vehicle speed, the less the ratio of the steering angle of the rear-front wheels (17) wherein the ratio ranges from 0.29 to 0.05.

* * * * *